United States Patent [19]

Araki et al.

[11] Patent Number: 5,139,866
[45] Date of Patent: Aug. 18, 1992

[54] MAGNETIC RECORDING MEDIUM

[75] Inventors: Hiroaki Araki; Kenichi Yoden; Akira Ushimaru, all of Kanagawa, Japan

[73] Assignee: Fuji Photo Film Co., Ltd, Kanagawa, Japan

[21] Appl. No.: 588,880

[22] Filed: Sep. 27, 1990

[30] Foreign Application Priority Data

Sep. 28, 1989 [JP] Japan .................................. 1-253254

[51] Int. Cl.$^5$ .............................................. G11B 23/00
[52] U.S. Cl. .................................... 428/323; 428/329; 428/336; 428/694
[58] Field of Search ................ 428/336, 694, 329, 900

[56] References Cited

U.S. PATENT DOCUMENTS

| | | | |
|---|---|---|---|
| 4,537,833 | 8/1985 | Kasuga et al. | 428/695 |
| 4,546,035 | 10/1985 | Ko et al. | 428/695 |
| 4,693,908 | 9/1987 | Rossi et al. | 428/695 |
| 4,759,954 | 7/1988 | Kubota et al. | 428/695 |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium excellent in electromagnetic conversion characteristics and running characteristics is disclosed, which comprises a non-magnetic support and a magnetic layer formed thereon, said magnetic layer containing ferromagnetic particles dispersed in a binder, wherein said magnetic layer comprises a number of pores, said pores having (a) a total volume of not more than 0.1 ml/g per unit weight of said magnetic layer,
(b) an average inlet radius of not more than 100 Å, and
(c) an average inner radius larger than said average inlet radius and a difference of at least 50 Å therebetween.

The pores preferably have a total pore volume of 0.03 to 0.1 ml/g measured by a nitrogen gas absorption method and an average pore inlet radius of not more than 50 Å, and the magnetic layer contains a fluorine-containing ester compound.

8 Claims, No Drawings

MAGNETIC RECORDING MEDIUM

FIELD OF THE INVENTION

The present invention relates to a magnetic recording medium, and more particularly to a magnetic recording medium excellent in electromagnetic conversion characteristics and running durability in high density recording such as short wave recording.

BACKGROUND OF THE INVENTION

Recently, magnetic recording media have been widely used as video tapes, audio tapes, magnetic tapes for computers and in other comparable tape materials. In such applications, the magnetic recording medium is required to be excellent in various characteristics such as electromagnetic conversion characteristics and running durability. In particular, adequate running characteristics as well as excellent magnetic conversion characteristic are both very important requirements, and it is necessary to optimize both characteristics in a compatible manner.

In order to meet both required characteristics, a magnetic disk has been proposed which is intended to prevent outputs due to surface properties and to improve durability at the same time by forming pores having an average pore area of $6 \times 10^{-5}$ to $7 \times 10^{-1}$ $\mu m^2$ (pore diameter: 86 Å to 9560 Å) in the surface of a magnetic layer by random orientation of the magnetic layer, and by further impregnating the pores with a lubricant as described in JP-A-62-137718 (the term "JP-A" as used herein means an "unexamined published Japanese patent application).

Following this development, a magnetic recording medium has been proposed in which pores contained in a coating layer have a pore diameter distribution of 0.01 to 0.1 $\mu m$ (100 to 1000 Å) and occupy 70% by volume is proposed with an object of improving the durability thereby as described in JP-A-63-167416.

More recently, however, systems of high image quality and high sound quality such as S-VHS and S-8 mm have been evaluated, and further systems such as high density type high visions and floppy disks have been evaluated. Accordingly, the demand for increase in recording density is greater. In order to achieve the increase of the density, it is necessary to make the surface of a magnetic layer extremely smooth, for example, to a center line average roughness (Ra; cut-off value: 0.25 mm) (according to JIS B 0601) of 10 nm or less, preferably 5 nm or less. Since such an extremely smooth surface increases the coefficient of friction encountered by the running tape, further improvements in running durability are required.

To satisfy such a demand, the average pore areas described in JP-A-62-137718 and JP-A-63-167416 described above are too large to obtain sufficient smoothness. Further, the sustaining effect of the lubricants is reduced because of the large inlet radius of the pores. Namely, in the prior-art magnetic recording media, the surfaces of the magnetic layers are not adequately smoothly formed, and, as a consequence, the sliding area of the magnetic layers on magnetic heads is relatively small. As a result, major problems are not encountered in sliding characteristics. However, such relatively unsmooth surfaces are not improved in S/N in ultra wavelength, and, therefore, excellent electromagnetic conversion characteristics can not be obtained. Also, the prior-art magnetic recording media have the drawback that the lubricants easily ooze or seep from the pores, because the inlet radius of the pores is relatively large, and, as a result, the lubricating effect cannot be sustained over a prolonged period of time.

Further, JP-A-62-22239 discloses that running stability and running durability are improved by adding a fatty acid to a magnetic layer and by extracting the fatty acid in an amount of 5 to 30 mg per $cm^3$ of magnetic layer from the surface of the magnetic layer with a non-polar hydrocarbon solvent. However, in the case of the magnetic recording media for high density recording having the extremely smoothed surfaces, even if such a so-called free fatty acid is contained in the magnetic layer, sufficient running stability and running durability can not be obtained.

Furthermore, JP-A-63-167413 discloses that fluorine-contained lubricants such as perfluoropolyethers can also be used. However, the ether linkage is relatively low in polarity and the inlet radius of the pores is relatively large, so that sufficient running stability and running durability can not be obtained.

SUMMARY OF THE INVENTION

It is therefore an object of the present invention to provide a magnetic recording medium which is particularly excellent in electromagnetic conversion characteristics in high density recording (short wave recording), and improved in running stability and running durability, particularly in running durability under the circumstances of low temperature and low humidity.

The above-described object of the present invention can be attained by the present invention hereinafter described.

Namely, the present invention provides a magnetic recording medium having a non-magnetic support and a magnetic layer formed thereon, the magnetic layer containing ferromagnetic particles dispersed in a binder, wherein the magnetic layer comprises a number of pores, the pores having
  (a) a total volume of not more than 0.1 ml/g per unit weight of the magnetic layer,
  (b) an average inlet radius of not more than 100 Å, and
  (c) an average inner radius larger than the average inlet radius and a difference of at least 50 Å therebetween.

More preferably, the present invention provides a magnetic recording medium having a non-magnetic support and a magnetic layer formed thereon, said magnetic layer containing ferromagnetic particles dispersed in a binder, in which pores formed on a surface of said magnetic layer have a total pore volume of 0.03 to 0.1 ml/g per unit weight of magnetic layer measured by a nitrogen gas absorption method hereinafter described and an average pore inlet radius of not more than 50 Å, and said magnetic layer contains a fluorine-containing ester compound.

DETAILED DESCRIPTION OF THE INVENTION

The magnetic recording media of the present invention can be produced by meeting the following requirements:

(1) The ferromagnetic powders contained in the magnetic layers are 35 $m^2/g$ or more in specific surface area, as measured by the BET method, and 100 to 300 Å in crystallite size, and preferably 45 $m^2/g$ or more in specific surface area. More preferably, the ferromagnetic powders are ferromagnetic alloy powders and 55 m²/g or more in specific surface area, as measured by the BET method. If the specific surface area is 100 m²/g or more, saturation magnetization, $\sigma_s$, is decreased. Hence, the range of 55 to 100 m²/g is practically preferable.

(2) The ratio of ferromagnetic powder content to binder content in the magnetic layers is 10 to 30 parts by weight, preferably 18 to 30 parts by weight, of the binder per 100 parts by weight of the ferromagnetic powder, and the content of other additives is smaller than that of the binder.

(3) When the magnetic recording media are produced, the magnetic layers are calendered with at least a pair of rigid rolls (for example, metal rolls having a center line surface roughness (Ra; cut-off value: 0.25 mm) of about 20 nm or less).

(4) The glass transition temperature Tg (the peak temperature of E") of the magnetic layers before the above-described calender treatment is at least 30° C., preferably at least 50° C. lower than the temperature of the calender treatment.

(5) When the magnetic recording media are produced, after dispersion of magnetic coating solutions, fluorine-containing ester compounds are added to the above-described magnetic coating solutions, and then the above-described magnetic coating solutions are applied to the non-magnetic supports to form the magnetic layers; or, alternatively, after application of the magnetic coating solutions, then the fluorine-containing ester compounds are overcoated thereon.

In the above item (1), the reason why the fine particles having an $S_{BET}$ of at least 35 m²/g is used is that the larger size of the ferromagnetic powders causes the larger radius of the pores. Namely, this is because the larger size of the powder particles forms larger spaces between the particles without a change in volume packing rate. In the present invention, fine apertured voids are easily obtained by using the fine particles.

Then, for the above item (2), if large amounts of binders are used, the pores become tightly packed to form little void space. Namely, the inner radius becomes small, so that the difference between the inner radius and the inlet radius becomes unduly small. On the other hand, too small amounts of binders cause the diameter of the pores to become unduly enlarged. Thus, the amount of use of the binders also influences the size of the pores.

With respect to the calender treatment in the above item (3), if the magnetic layers are calendered with an elastic roll and a metal roll, rubbing force as well as pressure is exerted. As a result, not only the inlet radius but also the inner radius is reduced. However, when the calender treatment is carried out between the metal rolls, the bores are collapsed only in the vicinity of the surfaces of the magnetic layers due to application of force under high pressure for a short period of time. For this reason, only the inlet radius is reduced and the inner radius is not reduced.

For the above item (4), if the Tg is high, coated films are decreased in fluidity at the calendering temperature, which results in difficulty of forming the desired pore dimensions. The inlet radius is therefore hard to decrease. However, if the Tg is too low, the durability is reduced.

By suitably selecting and combining the processes in (1) to (4), the magnetic recording media of the present invention can be obtained.

The magnetic recording media of the present invention are magnetic recording media from which the above-described drawbacks associated with conventional proposals are removed by controlling the structure of the pores in the magnetic layers to the above specified structure and which, as a result, are excellent in both electromagnetic conversion characteristics and running characteristics such as running stability and running durability.

The measurement of the pores in the magnetic layers of the present invention was carried out by the following nitrogen gas adsorption method.

An Autosorb 1 (Quantachrome Co., U.S.A.) was used as a measuring apparatus, and tapes 8 mm in width and about 10m in length were used as sample tapes. The sample tapes were preliminarily deaerated under a degree of vacuum of about $2\times 10^{-3}$ torr for at least 4 hours. A helium gas was used as a carrier gas and a nitrogen gas were used as a mixed gas. The helium gas and the nitrogen gas were used as a mixed gas. The partial pressure of the nitrogen gas was gradually increased from 0% to 100% to measure the adsorption isotherm, and then gradually decreased from 100% to 0% to measure the desorption isotherm. The measured data were analyzed by the BJH method [E. P. Barrett, L. G. Joyner and P. P. Halenda, *Journal of American Chemical Society* 73, 373 (1951)]. The inner radius of the pores was determined from the adsorption isotherm, and the inlet radius of the pores and the distribution thereof were determined from the desorption isotherm. Further, the total volume of the pores was determined from the integrated value of the adsorbed gas amounts.

The above-described measuring apparatus, Autosorb 1, is an apparatus for measuring in a fully automated manner the adsorption and desorption isotherms of nitrogen at liquid nitrogen temperature by using the "constant volume method" as described in the above *Journal of American Chemical Society* 73, 373 (1951)". The resulting isotherms were analyzed by a program stored in the computer attached thereto.

In the magnetic recording media of the present invention, the structure of the pores in the magnetic layers is controlled to the above specified structure.

If the above-described pores do not meet the above requirements, the running stability and running durability of the magnetic recording media are reduced, and the electromagnetic conversion characteristics are reduced in some cases.

In general, an increase in total pore volume or an increase in pore inner radius causes a reduction in electromagnetic conversion characteristics.

If the inlet radius of the pores is larger than the inner radius thereof, the lubricant is excessively available to the surface of the magnetic layer and becomes depleted by repeated running, which, in turn, results in deterioration of running stability and running durability.

Furthermore, the center line surface roughness (Ra) of the magnetic layers is preferably 10 nm or less, more preferably about 5 nm or less, when measured with a light interference type surface roughness tester (cut-off value: 0.25 mm).

This surface roughness means the center line average roughness (Ra) of all values measured with a digital optical profilometer (TOPO-3D, manufactured by WYKO) by the light interference method under the conditions that the number of pixels is 256×256 and the measuring area is 0.25 mm².

The present inventors further discovered by investigations that the fluorine-containing compounds, particularly the fluorine-containing ester compounds were effective not only for running stability and running durability, but also for still durability, with respect to the magnetic layers having a total pore volume of 0.03 to 0.1 ml/g according to the present invention.

These salutary effects result from the fact that the fluorine-containing ester compounds easily penetrate into the pores existing in the vicinity of the surfaces of the magnetic layers due to their low surface tension and strong water and oil repellency. This attribute of fluorine-containing ester compound is considered to improve upon the repeated running performance of the magnetic layer.

The fluorine-containing ester compounds have a lubricating effect under the high speed conditions due to their low inter-molecular force and high fluidity, which is thought to result in an improvement in still durability.

In the present invention, the fluorine-containing compound can be used in an amount of 0.01 to 10 parts by weight, preferably 0.02 to 5 parts by weight, more preferably 0.05 to 2 parts by weight per 100 parts by weight of the ferromagnetic powder. Specific examples of the fluorine-containing compounds used in the present invention are as follows. These compounds are readily available commercial products.

Fluorine-containing esters:
 (1) 2,2,3,3,4,4,5,5,6,6,7,7,8,8,9,9,9-Heptadecafluorononyl stearate
 (2) 2,2,3,3,4,4,5,5,6,6,7,7,8,8,9,9,9-Heptadecafluorononyl linolate
 (3) 2,2,3,3,4,4,5,5,6,6,7,7,8,8,9,9-Hexadecafluorononyl stearate
 (4) 2,2,3,3,4,4,5,5,6,6,7,7,8,8,9,9-Hexadecafluorononyl oleate
 (5) Isostearyl perfluorooctanoate
 (6) Oleyl perfluorooctanoate Fluorine-containing oligomer surface active agents:
 (1) Monoacrylate copolymer of vinyl perfluorooctanoate-ethylene oxide polymer (20)
 (2) Vinyl perfluorooctanoate-2-hydroxyethyl methacrylate copolymer Additional suitable fluorine-containing compounds include Compounds having perfluoroalkenyl groups:
 (1) Perfluorononenyloxybenzoic acid
 (2) 2-Carboxyl-4-perfluorononenyloxybenzoic acid
 (3) Octadecyl perfluorononenyloxybenzoate
 (4) Perfluorononenyloxybenzoic acid behenylamide
 (5) Ethylene oxide oligomer (20) monoperfluorononenyl ether acetate Of these compounds, the fluorine-containing ester compounds are particularly preferable.

The non-magnetic supports used in the present invention are not particularly limited. Supports generally employed can be used. Examples of materials forming the non-magnetic supports include films of various synthetic resins such as polyethylene terephthalate, polypropylene, polycarbonates, polyethylene naphthalate, polyamides, polyamideimides and polyimides; and foil of metals such as aluminum and stainless steel. Further, the thickness of the non-magnetic supports is also not particularly limited. In general, the thickness is 2.5 to 100 μm, preferably 3 to 80 μm. The surface roughness (Ra: light interference type surface roughness) of the supports is 0.05 μm or less, preferably 0.02 μm or less, more preferably 0.004 to 0.015 μm. In particular, when the supports having a surface roughness of 0.02 μm or less and, thus, excellent in surface smoothness are used, it is the most conducive for attaining the excellent effects of the present invention.

As the ferromagnetic powders in the present invention, known ferromagnetic powders can be used such as γ-iron oxide-series ferromagnetic powders, cobalt-γ-iron oxide-series ferromagnetic powders, ferromagnetic chromium dioxide powders, ferromagnetic metal or alloy powders, iron nitride-series ferromagnetic powders and hexagonal ferrites such as barium ferrite and strontium ferrite. Such ferromagnetic powders can be produced by methods generally known to those of skill in the art. In the present invention, it is preferred to use the ferromagnetic powders having a specific surface area of 35 m²/g or more, preferably 45 m²/g or more, which is measured by the BET method, and a crystallite size of 300 Å or less, preferably 250 Å or less.

The shape of the ferromagnetic powders is not particularly limited. Usually, needle-like, particle-like, die-like, rice grain-like and plate-like powders can be used.

As the binders for the magnetic layers in the present invention, any of known thermoplastic resins, thermosetting resins, radiation curable resins, reactive resins and mixtures thereof are used. It is more preferred that components which are crosslinkable or polymerizable by irradiation from a radiation source are which are contained in the above-described binders.

The above thermoplastic resins include acrylic esteracrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, vinyl chloride copolymers (details are described hereinafter), polyurethane resins (details are described hereinafter), urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (such as cellulose acetate butyrate, cellulose diacetate, cellulose triacetate, cellulose propionate and nitrocellulose), styrene-butadiene copolymers, polyester resins, chlorovinyl ether-acrylic ester copolymers, amino resins and various thermoplastic synthetic rubbers.

The above-described thermosetting resins or reactive resins are resins which have a molecular weight of 200,000 or less in the state of coating solutions, and whose molecular weight is significantly increased by heating after coating and drying. Examples of such resins include phenolic resins, phenoxy resins, epoxy resins, curable-type polyurethane resins, urea resins, melamine resins, alkyd resins, silicone resins, reactive acrylic resins, epoxy-polyamide resins, nitrocellulose-melamine resins, mixtures of high molecular weight polyester resins and isocyanate prepolymers, mixtures of methacrylate copolymers and diisocyanate prepolymers, mixtures of polyester polyols and polyisocyanates, urea-formaldehyde resins, mixtures of low molecular weight glycols, high molecular weight diols and triphenylmethane triisocyanate, polyamine resins and mixtures thereof.

Further, as the radiation curable resins, resins containing at least one carbon-carbon unsaturated bond in the molecule which is curable by irradiation can be used. Examples of the radiation curable resins include resins produced by introducing compounds containing at least one carbon-carbon unsaturated bond in the molecule into the above-described vinyl chloride copolymers or polyurethane resins, using the compounds as comonomers in copolymerization, or reacting the compounds with the above-described copolymers or resins. As the compounds containing at least one carbon-carbon unsaturated bond, compounds containing at least one (meth)acryloyl group in their molecule are preferably used. Such compounds may further contain glycidyl groups or hydroxyl groups.

Furthermore, other suitable compounds polymerizable by irradiation may be added to the above-described binders. Such compounds include (meth)acrylic esters, (meth)acrylic amides, allyl compounds, vinyl ethers, vinyl esters, vinyl heterocyclic compounds, N-vinyl compounds, styrenic compounds, acrylic acid, methacrylic acid, crotonic compounds, itaconic compounds and olefins. Of these compounds, the particularly preferred compounds include compounds containing at least two (meth)acryloyl groups in one molecule such as diethylene glycol di(meth)acrylate, triethylene glycol di(meth)acrylate, trimethylolpropane tri(meth)acrylate, pentaerythritol tetra(meth)acrylate and reaction products of polyisocyanates and poly(meth)acrylate.

As the above vinyl chloride copolymers, there can be used copolymers having a softening temperature of 150° C. or less and a number-average molecular weight of about 10,000 to 300,000.

Specific examples of the preferred vinyl chloride copolymers include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-maleic acid-vinyl alcohol copolymers, vinyl chloride-vinyl propionate-maleic acid copolymers, vinyl chloride-vinyl propionate-vinyl alcohol copolymers, vinyl chloride-vinyl acetate-acrylic acid copolymers, vinyl chloride-vinyl acetate-acrylic acid-vinyl alcohol copolymers and oxides of these above copolymers.

In particular, the vinyl chloride copolymers containing polar groups such as carboxyl groups or salts thereof, sulfonic groups or salts thereof, phosphoric groups or salts thereof, amino groups and hydroxyl groups are preferable in order to provide an improvement in dispersibility of the ferromagnetic powders.

As the above-described polyurethanes, useful polyurethanes include those produced from polyols and diisocyanates, and chain extenders as required, by methods generally known in the art.

Examples of the above polyols include compounds such as polyetherdiols, polyesterdiols, polycarbonatediols and polycaprolactonediols.

Typical examples of the above polyetherpolyols include polyalkylene glycol such as polyethylene glycol and polypropylene glycol.

The above polyesterpolyols can be synthesized, for example, by polycondensation of dihydric alcohols and dibasic acids or by ring-opening polymerization of lactones such as caprolactone. The typical dihydric alcohols are exemplified by glycols such as ethylene glycol, propylene glycol, butanediol, 1,6-hexanediol and cyclohexanedimethanol. Further, the typical dibasic acids are exemplified by adipic acid, pimeric acid, azelaic acid, sebacic acid, phthalic acid and terephthalic acid.

Furthermore, the polycarbonatepolyols include, for example, (a) polycarbonatepolyols having a number-average molecular weight of 300 to 20,000 and a hydroxyl value of 20 to 300, which are synthesized by condensation or ester interchange of polyhydric alcohols represented by the following general formula (I) and phosgene, chloroformic esters, dialkyl carbonates or diaryl carbonates:

$$HO-R^1-OH \qquad (I)$$

wherein $R^1$ represents, for example, $(CH_2)_n$ (wherein n is an integer of from 3 to 14),

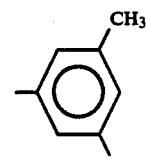,

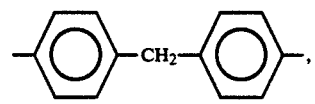,

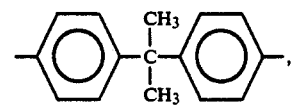,

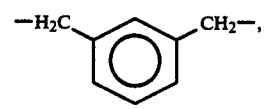,

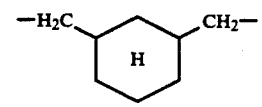,

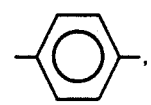,

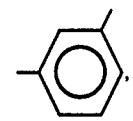,

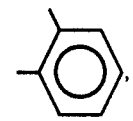,

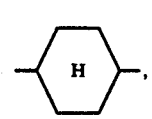,

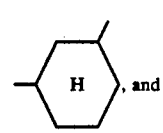, and

-continued

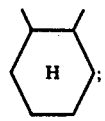

and (b) polycarbonate polyesterpolyols having a number-average molecular weight of 400 to 30,000 and a hydroxyl value of 5 to 300, which are obtained by condensation of the above polycarbonatepolyols and divalent carboxylic acids represented by the following general formula (II):

HOOC—R$^2$—COOH        (II)

wherein R$^2$ represents an alkylene group having 3 to 6 carbon atoms, a 1,4-, 1,3- or 1,2-phenylene group, or a 1,4-, 1,3- or 1,2-cyclohexylene group.

Other polyols such as polyetherpolyols, polyesteretherpolyols and polyesters may be incorporated in the above polyols in an amount of not more than 90% by weight of the above polyols to use them in combination with the above polyols.

The polyisocyanates used for obtaining the polyurethanes by reaction with the above polyols are not particularly limited. Polyisocyanates usually employed can be used. Examples of such polyisocyanates include hexamethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4,-diphenylmethane diisocyanate, p-phenylene diisocyanate, m-phenylene diisocyanate, 1,5 -naphthy lene diisocyanate, 4,4-diphenylmethane diisocyanate, 3,3-dimethylphenylene diisocyanate and dicyclohexylmethane diisocyanate.

The chain extenders include, for example, the above-described polyhydric alcohols, aliphatic polyamines, alicyclic polyamines and aromatic polyamines. The above-described polyurethanes may contain polar groups such as —COOM, —SO$_3$M, —OPO$_3$M and —OM (wherein M represents a hydrogen atom, sodium or potassium). The above binders may further contain compounds (polyisocyanates) having at least two isocyanate groups. Examples of such polyisocyanates include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohols; and polyisocyanates formed by condensation of these isocyanates.

The above-described isocyanates are commercially available under the trade names of Coronate L, Coronate HL, Coronate H, Coronate EH, Coronate 2030, Coronate 2031, Coronate 2036, Coronate 3015, Coronate 3041, Coronate 2014, Millionate MR, Millionate MTL, Daltosec 1350, Daltosec 2170 and Daltosec 2280 (manufactured by Nippon Polyurethane Industry Co., Ltd.); Takenate D-102, Takenate D-110N, Takenate D-200 and Takenate D-202 (manufactured by Takeda Chemical Industries, Ltd.); Sumidule N75 (manufactured by Sumitomo Bayer Co., Ltd.); Desmodule L, Desmodule IL. Desmodule N and Desmodule HL (manufactured by Bayer, West Germany); and Burnock D850 and Burnock D802 (manufactured by Dainippon Ink and Chemicals, Inc.).

The compounding ratio of the binder to the ferromagnetic powder in the magnetic layer of the magnetic recording medium of the present invention is preferably 10 to 30 parts by weight per 100 parts by weight of the ferromagnetic powder.

When the magnetic layers are calendered in producing the magnetic recording media of the present invention, it is preferred that the glass transition temperature Tg (peak temperature of E'') of the magnetic layers before the calender treatment is at least 30° C., preferably at least 50° C., lower than the calender treatment temperature. In general, the above glass transition temperature Tg is preferably 60° C. or less, particularly 40° C. or less. In order to obtain the glass transition temperature Tg meeting the above requirement, the kind or the amount used of the above-described binders is suitably selected, or the amount of solvents remaining in the magnetic layers is adjusted. In particular, if the compounds crosslinkable or polymerizable by irradiation are used as the binders, the adjustment of the glass transition temperature Tg can be easily carried out.

The magnetic layers of the magnetic recording media of the present invention can contain other various additives such as carbon black, fillers, abrasive materials, dispersing agents, antistatic agents lubricants, in addition to the above ferromagnetic powders, binders and fluorine-containing ester compounds. It is preferred that the content of such various additives is lower than that of the binders.

As the above carbon black, known carbon blacks such as furnace black, coloring black or acetylene black can be used. Also, carbon black whose surface is partly grafted may be used. It is preferred that carbon black having an average particle size of about 30 to 1,000 mμ is used. Also, fine-grained carbon black may be used in combination with coarse-grained carbon black.

There is no particular limitation on the above fillers. For example, granular fillers having average particle sizes ranging from 0.01 to 0.8 μm, preferably from 0.06 to 0.4 μm, which are usually employed, can be used. Examples of such fillers include particles of tungsten disulfide, calcium carbonate, titanium dioxide, magnesium oxide, zinc oxide, calcium oxide, lithopone and talc. They can be used alone or in combination.

From the viewpoint of the durability of the magnetic layers of the magnetic recording media, typical examples of the abrasive materials contained in the magnetic layers in the present invention include α-alumina, fused alumina, silicon carbide, chromium oxide, cerium oxide, corundum, artificial diamond, α-iron oxide, garnet, emery (main components: corundum and magnetite), silica, silicon nitride, boron nitride, molybdenum carbide, boron carbide, tungsten carbide, titanium carbide, tripoli, diatomaceous earth and dolomite. In particular, it is preferred that an abrasive material having Mohs' hardness of at least 6 is used alone or in combination of two to four kinds thereof.

The average particle size of the abrasive materials is preferably 0.005 to 5 microns, particularly 0.05 to 2 microns.

The dispersing agents include known dispersing agents such as fatty acids having 9 to 22 carbon atoms (such as caprylic acid, capric acid, lauric acid, myristic acid, palmitic acid, stearic acid, oleic acid, elaidic acid, linoleic acid, linolenic acid and stearolic acid), metallic soaps composed of the above-described fatty acids and alkali metals (such as lithium, sodium and potassium) or alkaline earth metals (such as magnesium, calcium and barium), compounds obtained by replacing the hydrogen atoms of esters of the above fatty acids or compounds thereof partly or wholly with fluorine atoms, amides of the above fatty acids, aliphatic amines, higher alcohols, polyalkylene oxide alkyl phosphates, alkyl phosphates, alkyl borates, sarcosinates, alkyl ether esters, trialkylpolyolefinoxy quaternary ammonium salts and lecithin. When the dispersing agent is used, it is usually used in amounts ranging from 0.05 to 20 parts by weight per 100 parts by weight of the binder.

The antistatic agents that can be used include conductive fine powders such as carbon black graft polymers; natural surface active agents such as saponin; nonionic surface active agents such as alkylene oxide series surface active agents, glycerol series surface active agents and glycidol series surface active agents; cationic surface active agents such as higher alkylamines, quaternary ammonium salts, salts of heterocyclic compounds such as pyridine, phosphoniums and sulfoniums; anionic surface active aqents containing acid groups such as carboxyl acid groups, sulfonic acid group, phosphoric acid groups, sulfate ester groups and phosphate ester groups; and amphoteric surface active agents such as amino acids, aminosulfonic acids and sulfates or phosphates of aminoalcohols. When the above conductive fine powder is used as the antistatic agents, it is used, for example, in an amount of 0.2 to 20 parts by weight per 100 parts by weight of the binder. When the surface active agent is used, it is used in amounts ranging from 0.1 to 10 parts by weight.

The lubricants which can be used in combination with the fluorine-containing compounds include known lubricants such as silicone oil, graphite fine powder, molybdenum disulfide fine powder and Teflon fine powder, and known lubricants for plastics, in addition to the above-described fatty acids, higher alcohols, fatty acid esters prepared from monobasic fatty acids having 12 to 20 carbon atoms and monohydric alcohols or polyhydric alcohols having 3 to 20 carbon atoms, such as butyl stearate and sorbitan oleate, mineral oils, vegetable oils, low olefin polymers and low α-olefin polymers The addition amount of the lubricants can be arbitrarily determined according to known techniques.

There is no particular restriction on solvents used in kneading, and solvents usually employed for preparation of magnetic coatings can be used.

Methods for kneading is also not particularly limited, and the order of adding the components can be properly established as appropriate.

Conventional kneading machines can be used for preparation of magnetic coatings. Examples of such kneading machines include two-roll mills, three-roll mills, ball mills, pebble mills, sand grinders, Szegvari attritors, high-speed impeller dispersing devices, high-speed stone mills, high-speed impact mills, dispers, kneaders, high-speed mixers, homogenizers and ultrasonic dispersing devices.

The above-described additives such as the dispersing agents, the antistatic agents and the lubricants can also be used to perform other functions. For example, the dispersing agent can also function as the lubricant or the antistatic agent. It is therefore understood of course that the effect and function of the compounds exemplified by the above classifications are not limited to their general characterizations. When a material having plural effects and functions is used, the addition amount thereof is preferably determined on considering the total effects and functions derived therefrom.

In addition, detergent-dispersants, viscosity index improvers, pour point depressants and anitfoaming agents may be added to the magnetic coatings.

The viscosity of the magnetic coatings thus prepared is usually within the range of 60 to 200 poise.

Although it is possible to apply the magnetic coating directly to the surface of the above non-magnetic support, it is also possible to apply the magnetic coating to the surface of the support through an adhesive layer or to the surface of the support which has been physically pre-treated (for example, by a corona discharge treatment or an electron beam irradiation treatment).

Examples of methods for applying the magnetic coating to the surface of the non-magnetic support include air doctor coating, blade coating, rod coating, extrusion coating, air knife coating, squeeze coating, impregnation coating, reverse roll coating, transfer roll coating, gravure coating, kiss coating, cast coating, spray coating and spin coating. Coating methods other than these methods can also be used. A simultaneous multilayer coating method (the so-called wet-on-wet coating method) may be employed.

It is preferred that the magnetic coating is applied such that the final thickness of the magnetic layer of the magnetic recording medium reaches 2 to 10 μm.

In general, the coated layer thus applied was subjected to a magnetic field orientation treatment in an undried state to orient the ferromagnetic powder contained in the magnetic layer. The magnetic field orientation treatment can be conducted according to methods known in the art.

Then, the coated layer is subjected to a drying step to dry the coated layer, thereby forming the magnetic layer. The drying step is usually carried out at 50° to 120° C. by heating the coated layer. The heating time is generally 10 seconds to 5 minutes.

After drying, the magnetic layer is usually subjected to a surface smoothing treatment.

The surface smoothing treatment is performed by a calender treatment. It is preferred that this calender treatment comprises a heating, pressurizing step using at least a pair (two stages) of rigid rolls, preferably at least three stages thereof. As the above rigid rolls, there are preferably used, for example, metal rolls having a center line surface roughness (Ra; cut-off value: 0.25 mm) of about 20 nm or less, more preferably about 10 nm. Examples of the above rigid rolls include various hard chrome plated or ceramic coated steel rolls and rolls whose surfaces are formed of super-hard alloy. A step using a combination roll unit of a rigid roll and an elastic roll, which is used in the normal calender treatment, may be added before and/or after the step using at least a pair of rigid rolls.

The above-described calender treatment is preferably carried out at a temperature of 50° to 110° C. under a line pressure of 50 to 1,000 kg/cm, preferably 50 to 350 kg/cm. If the calender treatment is conducted under the conditions outside the above ranges, the magnetic recording medium of the present invention cannot be produced. If the treating temperature or the line pressure is lower than the above lower limit, a magnetic recording medium which is excellent in electromagnetic conversion characteristics and running characteristics can not be produced. On the other hand, if the treating temperature or the line pressure is higher than the above upper limit, the magnetic recording medium is deformed or the rigid roll is damaged.

After performing the surface smoothing treatment as described above, an irradiation treatment or a heat treatment is suitably carried out, followed by cutting into a desired shape to form the magnetic recording medium.

As a radiation source in the above irradiation treatment, there can be used electron beams, $\gamma$-rays, $\beta$-rays and ultraviolet rays. The electron beams are preferably used. The irradiation of the electron beams is carried out by using an electron beam accelerator. By this irradiation with the electron beams, the binder component in the magnetic coating applied to the surface of the non-magnetic support is polymerized to cure.

The electron beams having an acceleration voltage of 100 to 500 kV, preferably 150 to 300 kV, are generally irradiated. The absorbed dose is generally 1.0 to 20 Mrads, preferably 2 to 10 Mrads. If the acceleration voltage is lower than 100 kV, the energy is insufficient, so that the curing reaction does not completely proceed in some cases. On the other hand, if the acceleration voltage is over 500 kV, the given energy exceeds the energy used in the polymerization reaction, which occasionally results in adverse effects to the magnetic layer and the non-magnetic support.

Also, if the absorbed dose is lower than 1 Mrad, the curing reaction insufficiently proceeds to give insufficient strength of the magnetic layer. In the meantime, if the absorbed dose exceeds 20 Mrads, the energy efficiency is reduced. Not only is this uneconomical, but also the irradiated material generates heat and the non-magnetic support is deformed by generated heat in some cases.

In the present invention, the time required for curing of the magnetic layer is significantly shortened by the above irradiation step with exposure to the radiation, in particular with electron beams, in comparison with normal heat curing treatments. Moreover, the amount of solvents used on the production can be greatly reduced. In addition, the quality is stabilized immediately after the production, and therefore the shipment of the products is possible immediately after the production.

In the present invention, it is preferred to irradiate with radiation after the application of the magnetic coating and the calender treatment as described above. However, it is also possible that the calender treatment is conducted after the irradiation. Further, in the latter case, it is possible to irradiate with radiation once again after calender treatment.

The surface of the non-magnetic support on the side on which the magnetic layer is not formed may be provided with a known backing layer. The backing layer is formed of carbon black and a binder in which particles of an inorganic filler 5 or more in Mohs' hardness are dispersed, and is a thin film layer having a thickness of 0.6 $\mu$m or less.

In the magnetic recording media of the present invention, the pores on the surfaces of the magnetic layers have specific features. For this reason, the magnetic recording media are excellent in running stability and running durability, as well as in electromagnetic conversion characteristics in short wavelength recording of 1 $\mu$m or less in wavelength. Namely, in the present invention, the total pore volume is 0.1 ml/g of magnetic layer material or less. However, if the total pore volume is larger than 0.1 ml/g, the packing rate of the magnetic layer and the output are reduced, which results in a decrease in C/N. In the present invention, since the total pore volume is 0.1 ml/g or less, the packing rate of the magnetic layer and the output are increased and the C/N is also improved. Further, in the present invention, the inlet radius of the pores is 100 Å or less. However, if the inlet radius is larger than 100 Å, the lubricant is readily discharged from the pores. Hence, the coefficient of friction $\mu$ value immediately begins to increase undesirably from an initially acceptable value and still durability decreases as a result. In the pores having an inlet radius of 100 Å or less, however, the lubricant gradually oozes or seeps out of the pores in appropriate amounts to the surface of the magnetic layer, so that the effect of reducing the $\mu$ value or the good still durability is maintained for a prolonged period of time. Furthermore, in the present invention, the difference between the inlet radius and the larger inner radius of the pores is 50 Å or more. If the difference is smaller than 50 Å, it results in a small inner radius, and reduces the effect of reserving the lubricant. The difference of 50 Å or more according to the present invention provides the sufficient effect of reserving the lubricant. Moreover, the fluorine-containing ester compounds are low in surface tension and have water and oil repellency. The pores are therefore easily impregnated with these compounds. Further, due to the suitable polarity and lubricity caused by the ester group, the sufficient still life and the effect of reducing the value and the contact noise are obtained particularly when the total pore volume is 0.03 to 0.1 ml/g and the inlet radius of the pores is 50 Å or less.

The present invention will be described with reference to the following Examples and Comparative Examples, in which all parts are by weight.

EXAMPLE 1

Composition of Magnetic Coating (Magnetic Coating A)

| | |
|---|---|
| Fine ferromagnetic metal powder (crystallite size: 150 Å, BET specific surface area: 55 m²/g) | 100 parts |
| Vinyl chloride copolymer acrylate (acid value: 3, number-average molecular weight: 20,000, average content of acryloyl groups: 2.8 groups/molecule) | 10 parts |
| Polyurethane acrylate (acid value: 1.8, number-average molecular weight: 10,000, average content of acryloyl groups: 3 groups/molecule) | 8 parts |
| Trimethylolpropane triacrylate | 4 parts |
| Stearic acid | 1.5 parts |
| Butyl stearate | 2 parts |
| $\alpha$-Alumina (average particle size: 0.2 $\mu$m) | 8 parts |
| Carbon black (oil absorption: 180 ml/100 g, average particle size: 28 m$\mu$) | 1 part |
| Cyclohexanone | 250 parts |
| Methyl ethyl ketone | 150 parts |

The above components were kneaded with a kneader, then roughly dispersed with a stirrer, and further finely dispersed with a sand mill. The resulting dispersion was filtered through a filter having an average pore size of 1 $\mu$m to prepare a magnetic coating.

The magnetic coating thus obtained was applied to the surface of a polyethylene terephthalate (hereinafter also referred to as PET) support having a thickness of 10 $\mu$m and a light interference type surface roughness (Ra; cut-off value: 0.25 mm) of 8 nm to give a thickness of 3.5 $\mu$m after drying, while running the support at a speed of 80 m/min. The non-magnetic support coated with the magnetic coating was subjected to a magnetic field orientation treatment with a cobalt magnet (3,000 gausses), while the magnetic layer was in a wet condition. After drying, a calender treatment and an electron beam irradiation treatment were conducted, followed by slitting to a width of 8 mm to produce a tape for 8-mm video tape recorders.

The calender treatment was carried out by using three stage metal rolls (Ra: 10 nm, cutoff value: 0.25 mm) at a calender treatment temperature of 90° C. under a line pressure of 260 kg/cm. The magnetic layer had a Tg of 0° C. when subjected to the calender treatment.

Further, the electron beam irradiation treatment was conducted at an acceleration voltage of 200 kV, in an irradiation dose of 5 Mrads, at an irradiation atmosphere temperature of 50° C., in an oxygen concentration of 10 ppm.

EXAMPLE 2

A video tape was produced in the same manner as with Example 1 with the exception that a calender treatment was carried out by using a calender unit having the following constituent rolls. The calender unit is composed of seven stages of constituent rolls. The same metal rolls as used in Example 1 were used as the first three stage rolls, and elastic rolls (the surfaces of the rolls were formed of an epoxy resin containing an inorganic filler) were used as the fourth and the sixth stage rolls. The same metal rolls as that of the first stage roll were used as the fifth and the seventh stage rolls.

EXAMPLE 3

A video tape was produced in the same manner as with Example 2 with the exception that the calender treatment temperature was changed to 60° C.

EXAMPLE 4

Composition of Magnetic Coating (Magnetic Coating B)

| | |
|---|---|
| Fine ferromagnetic metal powder (crystallite size: 180 Å, BET specific surface area: 53 m²/g) | 100 parts |
| Vinyl chloride copolymer (MR-110, manufactured by Nippon Zeon Co., Ltd.) | 10 parts |
| Polyurethane resin (N-2304, manufactured by Nippon Polyurethane Industry Co., Ltd.) | 4 parts |
| Polyisocyanate compound (Coronate L, manufactured by Nippon Polyurethane Industry Co., Ltd.) | 8 parts |
| Oleic acid | 0.5 part |
| Stearic acid | 1 part |
| Butyl stearate | 1.5 parts |
| $Cr_2O_3$ (average particle size: 0.3 μm) | 8 parts |
| Carbon black (oil absorption: 180 ml/100 g, average particle size: 28 mμ) | 1 part |
| Cyclohexanone | 250 parts |
| Methyl ethyl ketone | 250 parts |

The above components, except the polyisocyanate compound and oleic acid, were dispersed with a ball mill for 48 hours, and then the polyisocyanate compound and oleic acid were added thereto followed by further stirring. The resulting dispersion was filtered through a filter having an average pore size of 1 μm to prepare a magnetic coating.

The magnetic coating thus obtained was applied to the surface of a polyethylene terephthalate support having a thickness of 10 μm and a surface roughness (Ra; cut-off value: 0.25 mm) of 8 nm to give a thickness of 3.5 μm after drying, while running the support at a speed of 80 m/min. The non-magnetic support coated with the magnetic coating was subjected to a magnetic field orientation treatment with a cobalt magnet (3,000 gausses), while the magnetic layer was in a wet condition. After drying, a calender treatment was conducted, followed by slitting to a width of 8 mm to produce a tape for 8-mm video tape recorders. The calender treatment was carried out in the same manner as with Example 1 with the exception that the magnetic coating after coating was dried at a maximum temperature of 110° C. to adjust the Tg of the magnetic layer to 65° C. before the calender treatment.

EXAMPLE 5

A video tape was produced in the same manner as with Example 4 with the exception that the magnetic coating after coating was dried at a maximum temperature of 100° C. to adjust the Tg of the magnetic layer to 55° C. before the calender treatment.

EXAMPLE 6

A video tape was produced in the same manner as with Example 4 with the exception that the magnetic coating after coating was dried at a maximum temperature of 85° C. to adjust the Tg of the magnetic layer to 40° C. before the calender treatment.

COMPARATIVE EXAMPLE 1

A video tape was produced in the same manner as with Example 4 with the exception that the line pressure in the calender treatment was changed to 200 kg/cm.

COMPARATIVE EXAMPLE 2

A video tape was produced in the same manner as with Example 5 with the exception that all calender rolls were arranged so that the arrangement alternated between rigid rolls and elastic rolls to treat the magnetic recording medium.

COMPARATIVE EXAMPLE 3

A video tape was produced in the same manner as with Example 1 with the exception that the line pressure in the calender treatment was changed to 360 kg/cm.

With respect to the video tapes obtained in Examples and Comparative Examples as described above, the properties, for example, the total volume of the pores, the average inlet radius of the pores and the average inner radius of the pores of the magnetic layers and the characteristics of the video tapes were measured. The results are shown in Table 1.

The characteristics of the video tapes were evaluated by the following methods.

C/N Ratio

By using a commercial 8-mm video tape recorder (Fujix-8 made by Fuji Photo Film Co., Ltd.), a 5-MHz signal was recorded on a tape, and the noise generated within the range of 5±1 MHz when this signal was reproduced was measured. The ratio of the reproduced signal to this noise was determined. The measurement was carried out with an NV-870HD type output level meter (manufactured by Matsushita Electric Industrial Co., Ltd.). The values shown in Table 1 are values obtained when the C/N ratio of the video tape obtained in Comparative Example 1 is taken as 0 dB.

Still Life

A video signal of picture signal 501RE was recorded on a tape under the circumstance of 5° C. and 10% RH and then reproduced in the still mode, while the reproduced RF output level was recorded with a recorder. The time required for the signal level to decrease one-half was measured.

Coefficient of Dynamic Friction

A video tape was brought into contact with a stainless ball under a tension of 50 g ($T_1$), and a tension ($T_2$) required to run the tape under this condition at a speed of 3.3 cm/s was measured. The coefficient of dynamic friction $\mu_1$ of the video tape was calculated from this measurement in accordance with the following equation.

$$\mu = 1/\pi \cdot \ln T_2/T_1$$

After the video tape was run 100 times by using an 8-mm video tape recorder, the coefficient of dynamic friction $\mu_2$ of the video tape was determined by an operation similar to the above.

TABLE 1

| Sample | Magnetic Coating | Calender Number of Stages | Calender Roll | Calender Treatment Temperature (°C.) |
|---|---|---|---|---|
| Example 1 | A | 3 stages | All are metal | 90 |
| Example 2 | A | 7 stages | Fourth and sixth are elastic | 90 |
| Example 3 | A | 7 stages | Fourth and sixth are elastic | 60 |
| Example 4 | B | 3 stages | All are metal | 90 |
| Example 5 | B | 3 stages | All are metal | 90 |
| Example 6 | B | 3 stages | All are metal | 90 |
| Comparative Example 1 | B | 3 stages | All are metal | 90 |
| Comparative Example 2 | B | 3 stages | Second is elastic | 90 |
| Comparative Example 3 | A | 3 stages | All are metal | 90 |

| Sample | Line Pressure (kg/cm) | Tg on Calendering (°C.) | Total Pore Volume (ml/g) | Average Inlet Radius of Pores (Å) | Average Inner Radius of Pores (Å) |
|---|---|---|---|---|---|
| Example 1 | 260 | 0 | 0.009 | 30 | 140 |
| Example 2 | 260 | 0 | 0.005 | 40 | 100 |
| Example 3 | 260 | 0 | 0.013 | 40 | 150 |
| Example 4 | 260 | 65 | 0.070 | 50 | 160 |
| Example 5 | 260 | 55 | 0.050 | 40 | 120 |
| Example 6 | 260 | 40 | 0.035 | 35 | 95 |
| Comparative Example 1 | 200 | 65 | 0.110 | 70 | 200 |
| Comparative Example 2 | 260 | 55 | 0.080 | 130 | 180 |
| Comparative Example 3 | 360 | 0 | 0.002 | 25 | 50 |

TABLE 1-continued

| Sample | C/N Ratio (dB) | Still (min) | $\mu_1$ Coefficient of Dynamic Friction (1 pass) | $\mu_2$ Coefficient of Dynamic Friction (100 passes) |
|---|---|---|---|---|
| Example 1 | +2.8 | 60 or more | 0.31 | 0.32 |
| Example 2 | +3.7 | 60 or more | 0.33 | 0.33 |
| Example 3 | +3.0 | 50 | 0.32 | 0.34 |
| Example 4 | +1.9 | 60 or more | 0.28 | 0.30 |
| Example 5 | +2.5 | 60 or more | 0.29 | 0.30 |
| Example 6 | +2.9 | 45 | 0.33 | 0.34 |
| Comparative Example 1 | 0 | 60 or more | 0.25 | 0.26 |
| Comparative Example 2 | +1.5 | 30 | 0.25 | 0.43 |
| Comparative Example 3 | +4.5 | 10 | 0.42 | 0.44 |

It is apparent from the results shown in Table 1 that the video tape obtained in each Example of the present invention is significantly high in C/N ratio, excellent in still life, very low in the coefficient of dynamic friction, particularly after 100 passes, and extremely excellent in both electromagnetic conversion characteristics and running characteristics, as compared with the video tape obtained in each Comparative Example.

EXAMPLE 7

Composition of Magnetic Coating

| | |
|---|---|
| Ferromagnetic Fe—Ni alloy powder (crystallite size: 250 Å, BET specific surface area: 60 m$^2$/g) | 100 parts |
| Vinyl chloride copolymer (MR-110, manufactured by Nippon Zeon Co., Ltd.) | 10 parts |
| Polyurethane resin (N-2304, manufactured by Nippon Polyurethane Industry Co., Ltd.) | 4 parts |
| Polyisocyanate compound (Coronate L, manufactured by Nippon Polyurethane Industry Co., Ltd.) | 8 parts |
| Lubricant (shown in Table 2) | see Table 2 |
| $Cr_2O_3$ (average particle size: 0.3 m) | 8 parts |
| Carbon black (oil absorption: 180 ml/100 g, average particle size: 28 m$\mu$) | 1 part |
| Cyclohexanone | 250 parts |
| Methyl ethyl ketone | 250 parts |

The above components, except the polyisocyanate compound and the lubricant (fluorine-containing ester compound), were dispersed with a ball mill for 48 hours, and then the polyisocyanate compound and the lubricant were added thereto, followed by further stirring. The resulting dispersion was filtered through a filter having an average pore size of 1 $\mu$m to prepare a magnetic coating.

The magnetic coating thus obtained was applied to the surface of a PET support having a thickness of 15 $\mu$m and a surface roughness (Ra; cut-off value: 0.25 mm) of 8 nm to give a thickness of 3.0 $\mu$m after drying, followed by magnetic field orientation and drying. A calender treatment was carried out by using three stage metal rolls (Ra: 10 nm) at a calender treatment temperature of 90° C. under a line pressure of 380 kg/cm. After the calender treatment, a heat treatment was conducted at 60° C. for 4 days, followed by slitting to a width of 8 mm to produce a tape for 8-mm video tape recorders. This tape had a total pore volume of 0.025 ml/g, a pore inlet radius of 30 Å (average), and a pore inner radius of 100 Å (average).

The characteristics of the video tape thus obtained are shown in Table 2.

The characteristics of the video tape were evaluated by the following methods.

Still Life

A video signal of picture signal 50IRE was recorded on a tape under the circumstance of 5° C. and 10% RH and then reproduced in the still mode, while the reproduced RF output level was recorded with a recorder. The time required for the signal level to decrease one-half was measured.

Coefficient of Dynamic Friction

A video tape was brought into contact with a stainless ball under a tension of 50 g ($T_1$), and a tension ($T_2$) required to run the tape under this condition at a speed of 3.3 cm/s was measured. The coefficient of dynamic friction $\mu_1$ of the video tape was calculated from this measurement in accordance with the following equation.

$$\mu = 1/\pi \cdot \ln T_2/T_1$$

After the video tape was run 100 times by using an 8-mm video tape recorder, the coefficient of dynamic friction $\mu_2$ of the video tape was determined by an operation similar to the above.

Contact Noise

By using an NV-M21 deck (manufactured by Matsushita Electric Industrial Co., Ltd.), a test tape was run 10 times for 2 minutes under the circumstance of 23° C. and 10% RH. Then, the Y signal output was FFT treated with a spectrum analyzer HP-3585A (manufactured by Hewlett Packard Co., Ltd.) up to 1.2 to 4.5 NHz, and the peak output of its noise spectrum was measured. The difference in the maximum noise output between the noise spectrum on the first running and that on the tenth running is referred to as "contact noise".

TABLE 2

| Sample No. | Lubricant | | Still Life (min) |
|---|---|---|---|
| 1 | Stearic acid | 1.5 parts | 50 |
|   | Butyl stearate | 1.0 part | |
| 2 | 2,2,3,3,4,4,5,5,6,6,7,7,8,8,9,9,9-Heptadeca-fluorononyl linolate | 1.5 parts | 120 |
| 3 | Monoacrylate copolymer of vinyl perfluoroctanoate-ethylene oxide polymer (20) | 1.5 parts | 120 |
| 4 | Octadecyl perfluorononenyl-oxybenzoate | 1.5 parts | 120 |
| 5 | Terminal carboxylic acid-modified perfluoroethylene oxide-perfluoromethylene oxide copolymer | 1.5 parts | 120 |

| | $\mu$ Value | | Contact |
|---|---|---|---|
| Sample No. | $\mu_1$ 1 pass | $\mu_2$ 100 passes | Noise (dB) |

TABLE 2-continued

| 1 | 0.28 | 0.40 | 4 |
|---|---|---|---|
| 2 | 0.30 | 0.28 | 1 |
| 3 | 0.35 | 0.32 | 2 |
| 4 | 0.32 | 0.30 | 1.5 |
| 5 | 0.30 | 0.28 | 1 |

As apparent from the results shown in Table 2, samples obtained in this Example, particularly sample Nos. 2-5 using a fluorine-containing ester compound as a lubricant, are excellent in still life, very low in the coefficient of dynamic friction, particularly after 100 passes, and also low in contact noise.

While the invention has been described in detail and with reference to specific embodiments thereof, it will be apparent to one skilled in the art that various changes and modifications can be made therein without departing from the spirit and scope thereof.

What is claimed is;

1. A magnetic recording medium comprising a nonmagnetic support and a magnetic layer formed thereon, said magnetic layer containing ferromagnetic particles dispersed in a binder, wherein said magnetic layer comprises a number of pores, said pores having
   (a) a total volume of not more than 0.1 ml per gram of said magnetic layer,
   (b) an average inlet radius of not more than 100 Å, and
   (c) an average inner radius larger than said average inlet radius and a difference of at least 50 Å therebetween.

2. A magnetic recording medium as in claim 1, wherein pores formed on a surface of said magnetic layer have a total pore volume of 0.03 to 0.1 ml per gram of said magnetic layer measured by a nitrogen gas adsorption method, and an average pore inlet radius of not more than 50 Å, and said magnetic layer contains a fluorine-containing ester compound.

3. A magnetic recording medium as in claim 1, wherein said ferromagnetic particles have a specific surface area of 35 $m^2/g$ or more and a crystallite size of 300 Å or less.

4. A magnetic recording medium as in claim 1, wherein the ratio of ferromagnetic particle content to binder content is 10 to 30 parts by weight of binder per 100 parts by weight of ferromagnetic particles.

5. A magnetic recording medium as in claim 1, wherein a center line surface roughness (Ra) of said magnetic layer is 10 nm or less.

6. A magnetic recording medium as in claim 1, wherein said magnetic layer contains a fluorine-containing compound in an amount of 0.01 to 10 parts by weight per 100 parts by weight of ferromagnetic particles.

7. A magnetic recording medium as in claim 6, wherein said fluorine-containing compound is selected from a group consisting of fluorine-containing esters, fluorine-containing oligomer surface active agents and compounds having perfluoroalkenyl groups.

8. A magnetic recording medium as in claim 1, wherein said magnetic layer has a thickness of from 2 to 10 $\mu m$.

* * * * *